(12) United States Patent
Kamen et al.

(10) Patent No.: US 7,685,534 B2
(45) Date of Patent: Mar. 23, 2010

(54) METHOD AND APPARATUS FOR A THREE-DIMENSIONAL WEB-NAVIGATOR

(75) Inventors: Yakov Kamen, Cupertino, CA (US); Leon Shirman, Redwood City, CA (US)

(73) Assignee: JLB Ventures LLC, Washington, DC (US)

( * ) Notice: Subject to any disclaimer, the term of this patent is extended or adjusted under 35 U.S.C. 154(b) by 307 days.

(21) Appl. No.: 09/784,840

(22) Filed: Feb. 15, 2001

(65) Prior Publication Data

US 2002/0105551 A1    Aug. 8, 2002

Related U.S. Application Data

(60) Provisional application No. 60/182,870, filed on Feb. 16, 2000.

(51) Int. Cl.
*G06F 3/00* (2006.01)
*G09G 5/00* (2006.01)
*G06F 17/20* (2006.01)

(52) U.S. Cl. ............ 715/848; 715/738; 715/836; 715/976; 715/205; 345/419; 345/582

(58) Field of Classification Search ........ 345/419, 345/582, 854, 851, 849, 852, 737, 738, 739, 345/836; 715/501.1, 738, 739, 836, 848, 715/849–851, 976, 205
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,414,773 A | 5/1995 | Handelman | |
| 5,479,268 A | 12/1995 | Young et al. | |
| 5,485,197 A | 1/1996 | Hoarty | 725/37 |
| 5,532,754 A | 7/1996 | Young et al. | |
| 5,550,576 A | 8/1996 | Klosterman | |
| 5,684,525 A | 11/1997 | Klosterman | |
| 5,704,837 A | 1/1998 | Iwasaki et al. | |
| 5,724,492 A | 3/1998 | Matthews, III et al. | 345/419 |
| 5,737,028 A | 4/1998 | Bertram et al. | |
| 5,751,282 A | 5/1998 | Girard et al. | |
| 5,808,613 A * | 9/1998 | Marrin et al. | 345/744 |
| 5,818,441 A | 10/1998 | Throckmorton et al. | |

(Continued)

FOREIGN PATENT DOCUMENTS

JP    410093880 A    4/1998

(Continued)

*Primary Examiner*—X. L Bautista
(74) *Attorney, Agent, or Firm*—Banner & Witcoff, Ltd.

(57) ABSTRACT

A three-dimensional browser wherein in an exemplary embodiment, information from a uniform resource locator is converted into at least one texture. The texture is mapped onto a surface of a three-dimensional object located in a virtual three-dimensional space in order to provide a three-dimensional navigation mechanism. In an alternate arrangement an event associated with an image is intercepted and the location of the event in the corresponding geometric surface of the virtual three-dimensional space is computed. This location is converted to a two-dimensional coordinate and thereafter information pertaining to the event is placed on the surface on the three-dimensional object in the virtual three-dimensional space.

15 Claims, 4 Drawing Sheets

U.S. PATENT DOCUMENTS

| | | | |
|---|---|---|---|
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,977,964 A | 11/1999 | Williams et al. | 715/721 |
| 5,999,167 A | 12/1999 | Marsh et al. | |
| 5,999,187 A | 12/1999 | Dehmlow et al. | |
| 6,002,403 A | 12/1999 | Sugiyama et al. | 715/717 |
| 6,029,195 A | 2/2000 | Herz | |
| 6,043,818 A | 3/2000 | Nakano | 715/851 |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A * | 6/2000 | Bardon et al. | 345/419 |
| 6,088,032 A * | 7/2000 | Mackinlay | 715/848 |
| 6,167,188 A | 12/2000 | Young et al. | |
| 6,205,485 B1 | 3/2001 | Kikinis | |
| 6,233,389 B1 | 5/2001 | Barton et al. | |
| 6,243,039 B1 | 6/2001 | Elliot | |
| 6,266,100 B1 * | 7/2001 | Gloudemans et al. | 348/587 |
| 6,271,831 B1 | 8/2001 | Escobosa et al. | |
| 6,362,817 B1 * | 3/2002 | Powers et al. | 345/419 |
| 6,363,404 B1 * | 3/2002 | Dalal et al. | 715/513 |
| 6,381,362 B1 * | 4/2002 | Deshpande et al. | 382/162 |
| 6,414,677 B1 * | 7/2002 | Robertson et al. | 345/419 |
| 6,434,277 B1 * | 8/2002 | Yamada et al. | 382/285 |
| 6,611,262 B1 * | 8/2003 | Suzuki | 345/419 |
| 6,724,407 B1 * | 4/2004 | Cheng | 715/848 |
| 6,760,488 B1 * | 7/2004 | Moura et al. | 382/285 |
| 6,989,829 B2 * | 1/2006 | Haga et al. | 345/418 |
| 2001/0019332 A1 * | 9/2001 | Fisher | |
| 2002/0057277 A1 * | 5/2002 | Wood et al. | |

FOREIGN PATENT DOCUMENTS

| | | | |
|---|---|---|---|
| WO | WO 00/01149 A1 | 1/2000 | |

* cited by examiner

METHOD AND APPARATUS FOR A THREE-DIMENSIONAL WEB-NAVIGATOR

This application claims the benefit of the earlier filing date of co-pending provisional application of Yakov Kamen and Leon Shirman entitled "Mechanism and Apparatus for 3D Enabled Web-Navigator," Ser. No. 60/182,870, filed Feb. 16, 2000 and incorporated herein by reference.

BACKGROUND OF THE INVENTION

1. Field of the Invention

This invention relates generally to the field of browsers used on a network such as the Internet and more particularly to a three-dimensional browser.

2. Background

Browsing the Internet using a browser is known in the art. Two popular browsers are Netscape Navigator, commercially available from Netscape Communications, and Internet Explorer, commercially available from Microsoft Corporation. A browser is a computer program that allows users to view hypermedia documents on the Internet such as the World Wide Web.

A user typically invokes a browser program on a local computer and interacts with the browser to control the selection and display of information found on the Internet. For instance, a user typically uses a mouse and clicks on a particular hypertext. The browser extracts the hidden reference information associated with the item and uses that information to determine which remote server should be contacted and which item should be requested from that server. A browser then closes the connection and displays the information to the user.

One disadvantage of using a two-dimensional browser is that, with respect to virtual three-dimensional web sites, it is difficult to determine where the two-dimensional browser is located relative to three-dimensional elements in a virtual three-dimensional web site. Accordingly, it is desirable to have a browser that addresses this disadvantage associated with the conventional browsers.

SUMMARY

One embodiment of the invention relates to creating a three-dimensional navigation mechanism such as a three-dimensional browser to navigate a virtual three-dimensional space. The virtual three-dimensional space may be created using a conventional three-dimensional graphics pipeline that converts two-dimensional information obtained from a uniform resource locator (URL) into a three-dimensional object or it may be an existing three-dimensional virtual space. Techniques of the invention include converting information obtained from a URL into a texture (e.g., logos such as ABC™). The one or more textures are then mapped on a geometric surface (e.g., the surface of a three-dimensional object) located in the virtual three-dimensional space. This process creates the three-dimensional navigation mechanism.

In another embodiment of the invention, the position of the newly created three-dimensional navigation mechanism is determined using several steps. For instance, at least one event (e.g., a user selecting hypertext) associated with an image created from information obtained from a URL is intercepted. After an event is intercepted, an area of the surface on a three-dimensional object in the virtual three-dimensional space that is associated with the event is located. The location of the area of the surface is provided in three-dimensional coordinates. A two-dimensional position is then computed from the three-dimensional coordinates. After this two-dimensional position has been computed, information pertaining to the event is then placed on the surface of the three-dimensional object and displayed to the user. By implementing techniques of the invention, a network such as the Internet may be navigated in a virtual three-dimensional space using a three-dimensional navigation mechanism.

In another embodiment, two-dimensional navigators such as the Netscape Navigator and the Microsoft Explorer may be transformed into three-dimensional browsers to operate in a virtual three-dimensional space by implementing technique of the invention. Additional features, embodiments, and benefits will be evident in view of the figures and detailed description presented herein.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings

DETAILED DESCRIPTION

One embodiment of the invention relates to creating a three-dimensional navigation mechanism such as a three-dimensional browser that navigates a three-dimensional virtual space. The virtual three-dimensional space is created, for example, by using a conventional pipeline such as a three-dimensional graphics pipeline to convert information obtained from a uniform resource locator (URL) to be placed onto surfaces of the three-dimensional object. The method includes converting data obtained from a uniform resource locator (URL) into a texture. Specifically, the texture is then mapped on a surface of a three-dimensional object in a virtual three-dimensional space.

In another embodiment, the position of the three-dimensional browser in a virtual three-dimensional space is determined. In order to determine the position of the three-dimensional browser, several steps are implemented. For instance, at least one event (e.g. clicking on hypertext) associated with an image created from information obtained from a URL is intercepted. An area associated with the event is then located. The position of the surface on the three-dimensional object in a three-dimensional virtual space is computed. Thereafter, information pertaining to the event is placed on the surface of that three-dimensional object.

In yet another embodiment, two-dimensional navigators such as the Netscape Navigator and the Microsoft Explorer may be transformed into three-dimensional browsers configured to navigate a virtual three-dimensional space by implementing techniques of the invention.

In the description that follows, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

Figure 1:
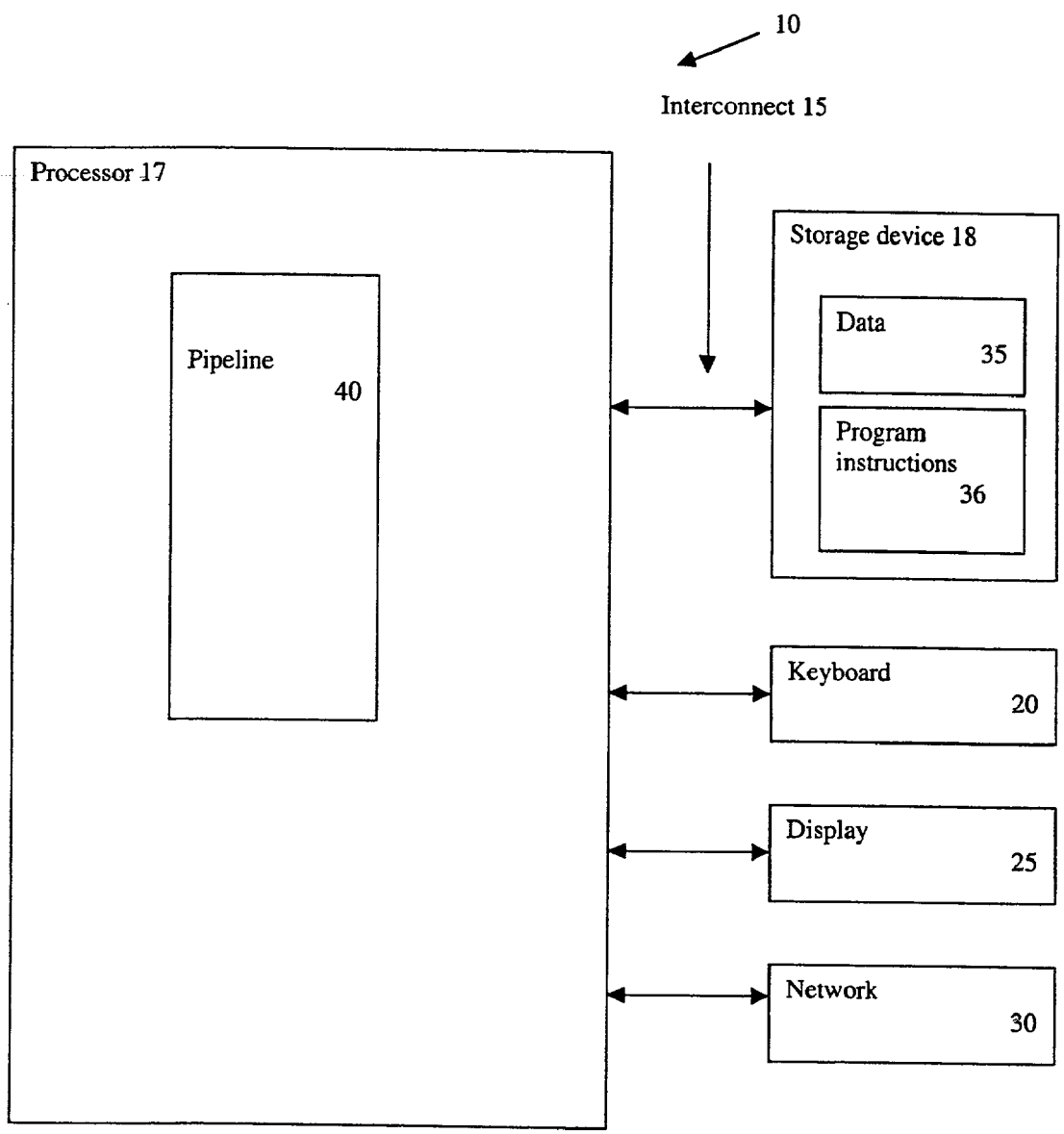
FIG. 1 illustrates a schematic diagram of a computer system in accordance with one embodiment of the invention.
Figure 2:
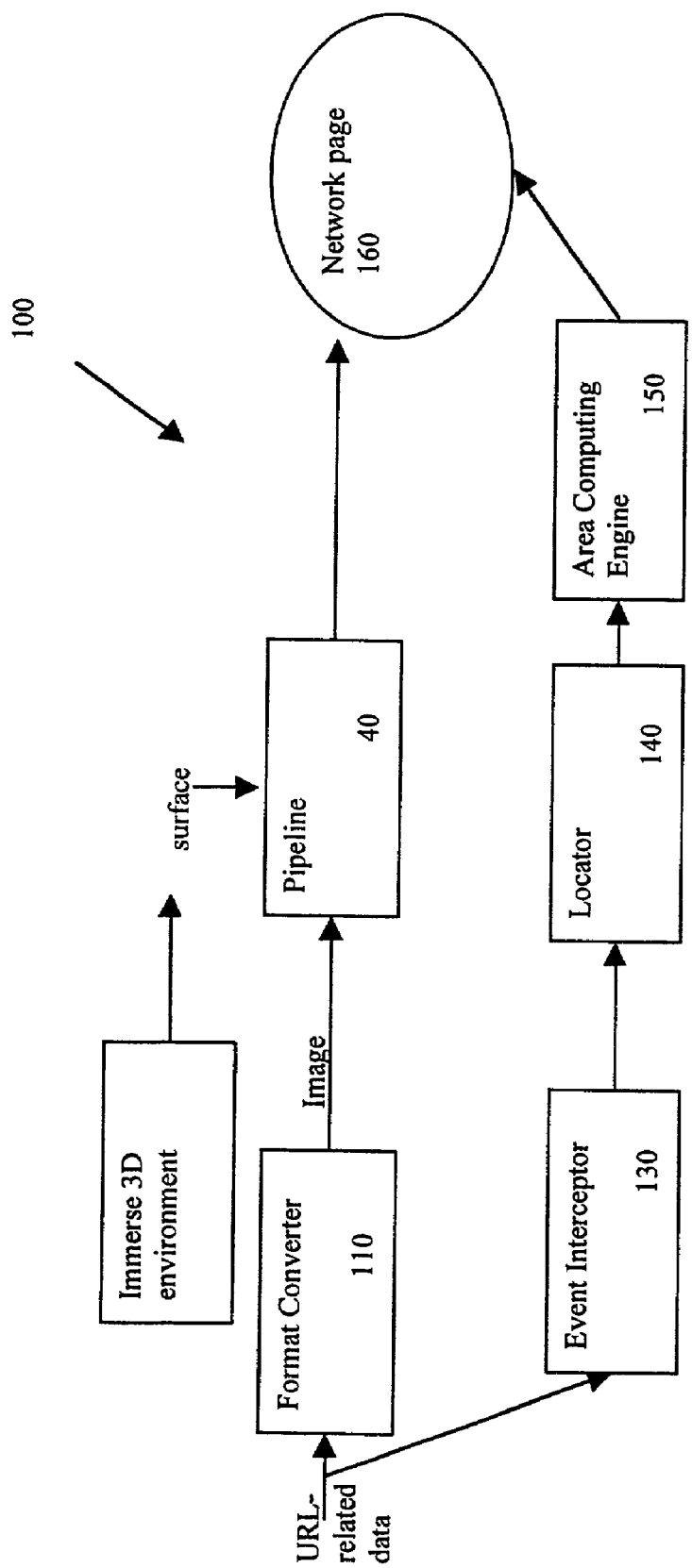
FIG. 2 illustrates a block diagram of the program instructions used to create a three-dimensional navigation device to navigate a three-dimensional virtual space in accordance with one embodiment of the invention.
Figure 3:
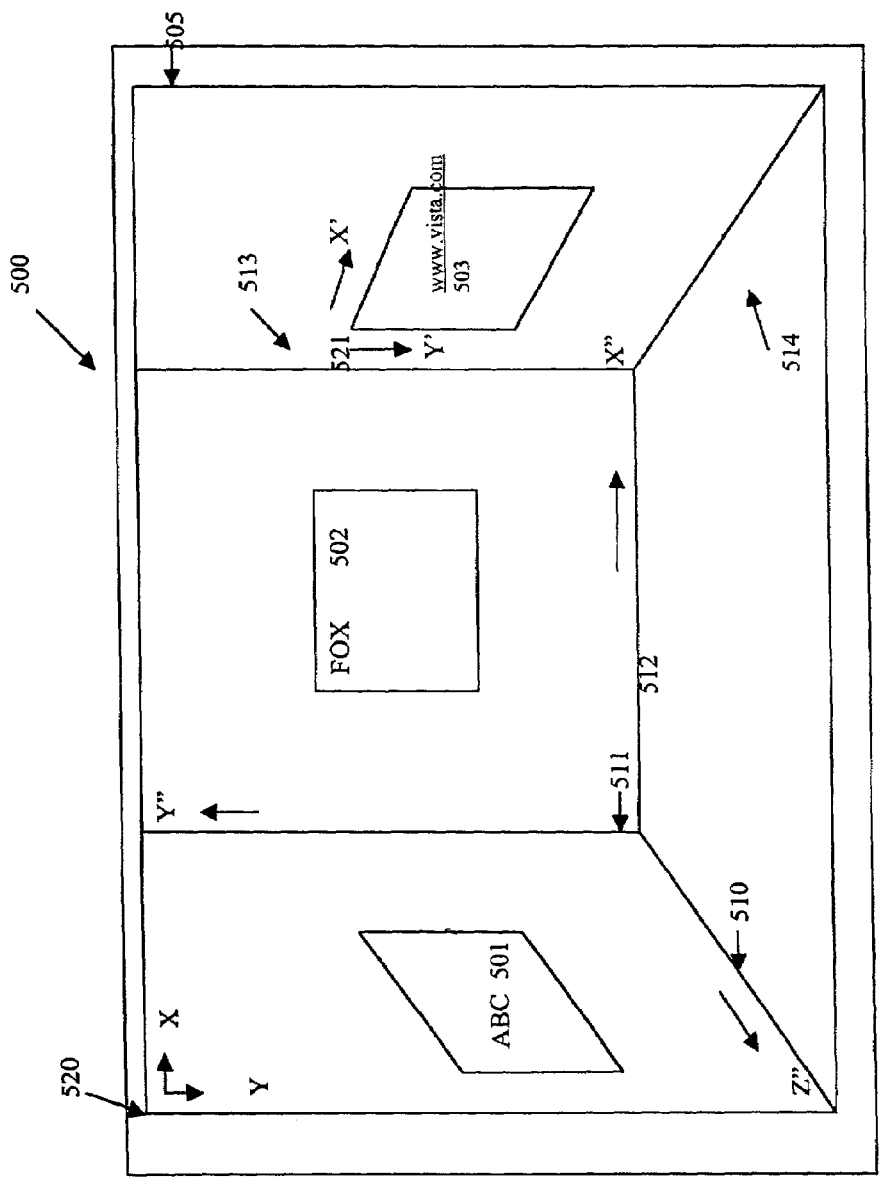
FIG. 3 illustrates a flow diagram for forming a three-dimensional browser in accordance with one embodiment of the invention.
Figure 4:
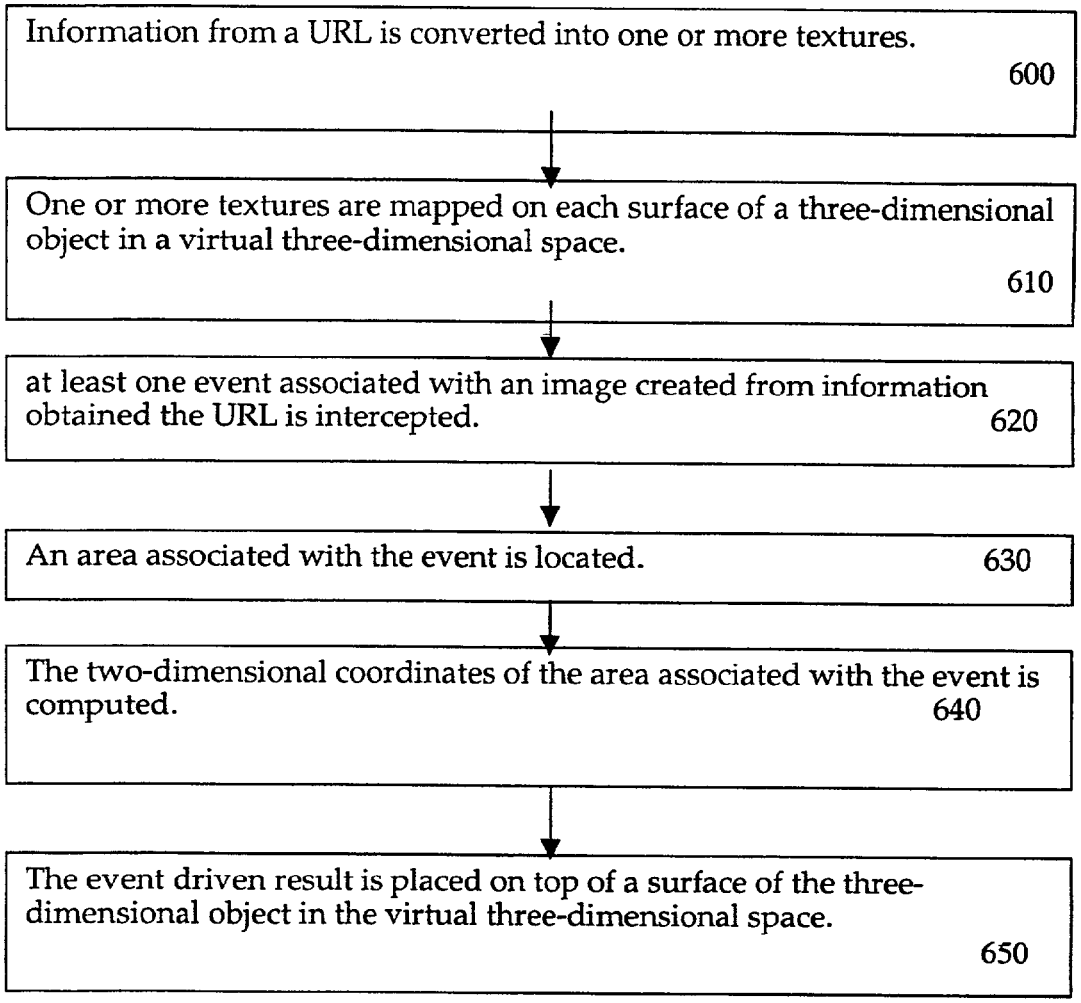
FIG. 4 illustrates a schematic diagram of a dimensional browser in accordance with one embodiment of the invention.

FIG. 1 illustrates the computer system used to create and locate the three-dimensional browser in the virtual three-dimensional space. FIGS. 2 and 4 illustrate the program instructions used to implement techniques of the claimed invention. FIG. 3 illustrates a three-dimensional browser in a virtual three-dimensional space.

FIG. 1 illustrates one embodiment of a computer system 10 that implements the principles of the present invention. Computer system 10 comprises processor 17, storage device 18, and interconnect 15 such as bus or a point-to-point link. Processor 17 is coupled to the storage device 18 by interconnect 15. In addition, a number of user input/output devices, such as keyboard 20 and display 25, are coupled to chip set (not shown) that is then connected to processor 17. The chipset (not shown) is typically connected to processor 17 using an interconnect that is different from interconnect 15.

Processor 17 represents a central processing unit of any type of architecture (e.g., the Intel architecture, Hewlett Packard architecture, Sun Microsystems architecture, IBM architecture, etc.), or hybrid architecture. In addition, processor 17 could be implemented on one or more chips. Storage device 18 represents one or more mechanisms for storing data. Storage device 18 may include read only memory (ROM), random access memory (RAM), magnetic disk storage mediums, optical storage mediums, flash memory devices, and/or other machine-readable mediums. Interconnect 15 represents one or more buses (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the invention could be implemented in a multiprocessor computer system through a network such as that which is typically found in a corporation. In addition to other devices, one or more of a network 30 may be present. Network 30 represents one or more network connections for transmitting data over a machine-readable media.

FIG. 1 also illustrates that the storage device 18 has stored therein data 35 and program instructions (e.g., software, computer program, etc.) 36. Data 35 represents data stored in one or more of the formats described herein. Program instructions 36 represents the necessary code for performing any and/or all of the techniques described with reference to FIGS. 2 and 4. It will be recognized by one of ordinary skill in the art that storage device 18 preferably contains additional software (not shown), which is not necessary to understanding the invention.

FIG. 1 additionally illustrates that the processor 17 includes pipeline 40. Pipeline 40 is a conventional three-dimensional graphics pipeline that may be a program instruction pipeline (e.g., software, computer program, etc.) or hardware pipeline. Pipeline 40 is used for decoding instructions received by processor 17 into control signals and/or microcode entry points, pipeline 40 performs the appropriate operations. In one embodiment, pipeline 40 creates a virtual three-dimensional space using information obtained from, for example, URLs. It will be appreciated, however, that techniques of the invention may be used at web sites in which three-dimensional spaces have already been established. In yet another embodiment, pipeline 40 is used to project onto a screen a texture (e.g., ABC logo) or textures mapped on each surface of a three-dimensional object. The texture mapping and projecting processes involve conventional transformation processes. Details as to how texture mapping is performed is found in Method And Apparatus For Using A General Three-Dimensional (3D) Graphics Pipeline For Cost Effective Digital Image Video Editing, Transformation, and Representation, Ser. No. 10/004,737, filed on Dec. 4, 2001, now U.S. Pat. No. 6,525,728, by Yakov Kamen and Leon Shirman, which is incorporated by reference.

FIG. 2 illustrates a block diagram of the program instructions used to create and interact with a three-dimensional navigation device such as a browser to navigate a three-dimensional virtual space in accordance with one embodiment of the invention. System 100 includes format converter 110, pipeline 40, event interceptor 130, locator 140, area computing engine 150, and network (e.g., Internet) page 160. Each of these components is discussed below.

Format converter 110 receives information obtained from, for example, a URL. A URL is a unique address designated by a short character string used by browsers to identify a particular page of information on, for example, the World Wide Web. This information may be coded in a variety of programming languages such as in hypertext markup language (HTML), typically used to specify the contents and format of a hyper-media document in the WWW; JAVA a programming language used to create active Web pages; or, other suitable programming languages. After format converter 110 receives information from the URL, format converter 110 converts this information into an image such as a texture (e.g., ABC logo).

Generally, a texture is defined in a texture space having a two-dimensional coordinate system (u,v). The texture includes intensity values referred to as textural elements or "texels" that form a portion of the image. Pipeline 40 receives the texture(s) and performs texture mapping on the textures. Texture mapping transforms the texture defined in a texture space onto a surface of a three-dimensional object located in a three-dimensional space and then projects the transformed texture onto a display screen in the image space having a three-dimensional coordinate system (x', y', z'). The resultant display or image is defined in an image space having a two-dimensional coordinate system (x, y). This process is similar to applying a decal, which represents the texture, onto an object and then projecting the applied decal onto a surface of the three-dimensional object using pipeline 40.

The texture maps are then sent to network page 160 that displays the texture maps relative to the information inputted by a user such as a user selecting a particular hyperlink. FIG. 3, described in greater detail below, represents an example of network page 160 that may be created by implementing techniques of the invention.

Event interceptor 130, locator 140, and area computing engine 150 of FIG. 2 are program instructions that process an act or actions by a user that determines the position of the three-dimensional browser in the virtual three-dimensional space. Each of these components is described below.

Event interceptor 130 intercepts events associated with a URL. An event is an incident of importance in which a user performs some action that interacts with an object in a display. An example of an event includes a user inputting data by using an input/output device such as a mouse that clicks on an object (e.g., hyperlink) shown in the display. Another example is a user typing information on a keyboard for selecting hypertext that is sent to the processor. Yet another example is a user moving a mouse to focus on an icon that causes a pull down menu to be displayed.

After event interceptor 130 has processed the event, locator 140 locates an area (e.g. the surface of a three-dimensional object) associated with each event. For example, locator 140 determines that a user may have used a mouse to click on, for instance, a particular hypertext and locates the three-dimensional coordinates of that hypertext using conventional techniques. Hyperlinked text in a file that, when highlighted by a mouse or otherwise selected, causes the automatic display of a related file. Hypertext is usually denoted by having a different color or format (i.e., underlining) from the surrounding plain text.

Using pipeline 40 of computing system 10 and the three-dimensional coordinates of the area associated with the event, area computing engine 150 computes a two-dimensional position of that area. The purpose of transforming three-dimensional coordinates for the surface on a three-dimensional object to two-dimensional coordinates is to allow conventional operating systems such as the Windows operating system, commercially available from Microsoft Corporation, to recognize the position of the surface on the three-dimensional object. Conventional operating systems typically are limited to recognizing two-dimensional coordinates and are unable to accurately process three-dimensional coordinates.

One example of the operation of area computing engine 150 is a user who selects a particular hypertext displayed on the surface of a three-dimensional object in a three-dimensional virtual space by clicking on the hypertext. Area computing engine 150 receives the hypertext's three-dimensional coordinates in the virtual three-dimensional environment and uses pipeline 40 together with conventional techniques to transform the hypertext's three-dimensional coordinates to two-dimensional coordinates. This data, related to the surface on the three-dimensional object that displays the browser, is then transferred to the memory and the processor of the computing system.

After area computing engine 150 has computed the browser's position, an event driven result is applied to the surface of the three-dimensional object. For example, a reference associated with hypertext is displayed to the user.

Two-dimensional browsers such as Netscape Navigator an Internet Explorer may be transformed into a three-dimensional navigator by using the operations described relative to event interceptor 130, locator 140, area computing engine 150, and placing an event driven result on a geometric surface such as a surface on the three-dimensional object.

FIG. 3 illustrates an example of a browser and hypertext in an "immersive" type three-dimensional environment placed on three-dimensional object 505 such as a virtual three-dimensional room depicted in screen 500. In this embodiment, three-dimensional object 505 is created by pipeline 40 of computing system 10 from information obtained from the URL. The walls and floors of the virtual three-dimensional room are formed by separation lines 510, 511, 512, 513, and 514. Picture frame 501, hung on the walls, is an object that has a texture showing the ABC™ logo. The ABC™ logo is a hypertext to the ABC television station. If the user clicks on that texture, the ABC television station will appear on the wall defined by separation lines 510 and 511. Similarly, picture frame 502 has a hypertext to the FOX™ television station that also allows a user to click on it causing the FOX™ television station to appear to the user on the wall defined by separation lines 511, 512, and 513.

Picture frame 503 contains a texture (representing a browser) that was applied to a surface of three-dimensional object 505. If the user clicks on picture frame 503, the coordinates of picture frame 503 are given relative to screen 500 such as by origin 520 at x and y coordinates. Since the browser typically operates in conventional operating systems, the browser is unable to determine that it is in a three-dimensional space. The operating system in which the browser is used generally receives coordinates of the browser relative to its origin, as if the browser operates in a flat window on screen 500. However, the browser's coordinate system has its origin at 521 and the browser's axis (x', y') is not parallel to the axis of screen 500. Pipeline 40 obtains a three-dimensional coordinate of the browser relative to the three-dimensional world (not shown for simplicity) relative to axis (x", y" and z") which then is transformed by area computing engine 150 into the browser's two-dimensional space (x', y'). Any change such as the position of the browser is then updated by updating the texture map using pipeline 40.

FIG. 4 illustrates a flow diagram of one method of creating and interacting with a three-dimensional browser in a virtual three-dimensional space in accordance with one embodiment of the invention. Blocks 600 and 610 relate to the creation of the three-dimensional browser. At block 600, information from a URL is converted into one or more textures (e.g., logo such as the ABC logo). At block 610, one or more texture(s) are mapped on each surface of a three-dimensional object in the virtual three-dimensional space. On one surface of the three-dimensional object, an image created from this process displays the three-dimensional browser. Blocks 620 through 650 relate to determining the position of the three-dimensional browser. At block 620, at least one event associated with an image created from information obtained the URL is intercepted. At block 630, an area associated with the event is located. For example, the three-dimensional coordinates of an area on a three-dimensional object are determined. At block 640, two-dimensional coordinates of the area associated with the event is computed by using, for example, pipeline 40 and the three-dimensional coordinates of the area on the three-dimensional object. At block 650, the event driven result is placed on top of a surface of the three-dimensional object in the virtual three-dimensional space.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A computer-implemented method comprising:
   creating a virtual three-dimensional space having a plurality of walls including a first wall and a second wall;
   creating in the virtual three-dimensional space a first three-dimensional object with at least two surfaces;
   converting information from a first uniform resource locator into a first texture;
   mapping the first texture onto a first surface of the first three-dimensional object; and
   in response to the first three-dimensional object being selected, displaying information from the first uniform resource locator on less than all of the plurality of walls.

2. The computer-implemented method of claim 1 further comprising:
   in response to the first texture being selected, displaying information from the first uniform resource locator on a surface of the first three-dimensional object.

3. The computer-implemented method of claim 2, further comprising:
   determining that a non-texture area of the first three-dimensional object has been selected.

4. The computer-implemented method of claim 2, further comprising:
   determining that an area of the first texture has been selected:
   obtaining three-dimensional coordinates of the area; and
   transforming the three-dimensional coordinates into two-dimensional coordinates.

5. The computer-implemented method of claim 1, further comprising:
   creating in the virtual three-dimensional space a second three-dimensional object with at least two surfaces;
   converting information from a second uniform resource locator into a second texture;
   mapping the second texture onto a second surface of the second three-dimensional object; and
   in response to the second three-dimensional object being selected, displaying information from the second uniform resource locator on the second wall.

6. An apparatus comprising:
   a processor;
   a memory operatively coupled to the processor and storing machine executable instructions, that when executed, cause the apparatus to:
   create a virtual three-dimensional space having a plurality of walls including a first wall and a second wall;
   create in the virtual three-dimensional space a first three-dimensional object with at least two surfaces;
   convert information from a first uniform resource locator into a first texture;
   map the first texture onto a first surface of the first three-dimensional object; and
   in response to the first three-dimensional object being selected, display information from the first uniform resource locator on less than all of the plurality of walls.

7. The apparatus of claim 6, the memory further storing machine executable instructions, that when executed, cause the apparatus to:
   in response to the first texture being selected, display information from the first uniform resource locator on a surface of the first three-dimensional object.

8. The apparatus of claim 7, the memory further storing machine executable instructions, that when executed, cause the apparatus to:
   determine that a non-texture area of the first three-dimensional object has been selected.

9. The apparatus of claim 7, the memory further storing machine executable instructions, that when executed, cause the apparatus to:
   determine that an area of the first texture has been selected:
   obtain three-dimensional coordinates of the area; and
   transform the three-dimensional coordinates into two-dimensional coordinates.

10. The apparatus of claim 6, the memory further storing machine executable instructions, that when executed, cause the apparatus to:
    create in the virtual three-dimensional space a second three-dimensional object with at least two surfaces;
    convert information from a second uniform resource locator into a second texture;
    map the second texture onto a second surface of the second three-dimensional object; and
    in response to the second three-dimensional object being selected, display information from the second uniform resource locator on the second wall.

11. A computer readable media storing computer executable instructions, that when executed, cause an apparatus to perform:
    creating a virtual three-dimensional space having plurality of walls, including a first wall and a second wall;
    creating in the virtual three-dimensional space a first three-dimensional object with at least two surfaces;
    converting information from a first uniform resource locator into a first texture;
    mapping the first texture onto a first surface of the first three-dimensional object; and
    in response to the first: three-dimensional object being selected, displaying information from the first uniform resource locator on less than all of the plurality of walls.

12. The computer readable media of claim 11, wherein the computer executable instructions, when executed, further cause the apparatus to perform:
    in response to the first texture being selected, displaying information from the first uniform resource locator on a surface of the first three-dimensional object.

13. The computer readable media of claim 12, wherein the computer executable instructions, when executed, further cause the apparatus to perform:
    determining that a non-texture area of the first three-dimensional object has been selected.

14. The computer readable media of claim 12, wherein the computer executable instructions, when executed, further cause the apparatus to perform:
    determine that art area of the first texture has been selected;
    obtaining three-dimensional coordinates of the area; and
    transforming the three-dimensional coordinates into two-dimensional coordinates.

15. The computer readable media of claim 11, wherein the computer executable instructions, when executed, further cause the apparatus to perform:
    converting information from a second uniform resource locator into a second texture;
    mapping the second texture onto a second surface of the second three-dimensional object; and
    in response to the second three-dimensional object being selected, displaying information from the second uniform resource locator on the second wall.

* * * * *